United States Patent [19]
Fukuchi et al.

[11] Patent Number: 6,097,576
[45] Date of Patent: Aug. 1, 2000

[54] MAGNETIC HEAD

[75] Inventors: Kiyoshi Fukuchi, Musashino; Fumio Nagase, Tama; Yoshiaki Sakai, Hgashikurume, all of Japan

[73] Assignee: Teac Corporation, Tokyo, Japan

[21] Appl. No.: 08/383,658

[22] Filed: Feb. 2, 1995

Related U.S. Application Data

[63] Continuation of application No. 08/053,601, Apr. 27, 1993, abandoned.

[30] Foreign Application Priority Data

May 6, 1992 [JP] Japan ................................. 4-113645

[51] Int. Cl.[7] ................................. G11B 5/48; G11B 5/60
[52] U.S. Cl. ................................. 360/246.2; 360/236.8
[58] Field of Search ................................. 360/103, 104

[56] References Cited

U.S. PATENT DOCUMENTS 4,912,582  3/1990  Gomi et al. ............................. 360/104
5,235,483  8/1993  Hayakawa et al. ...................... 360/103

FOREIGN PATENT DOCUMENTS 194164  11/1983  Japan ................................. 360/103
248178  10/1987  Japan ................................. 360/103
296474  11/1989  Japan ................................. 360/103
 49018   3/1991  Japan ................................. 360/103

*Primary Examiner*—George J. Letscher
*Attorney, Agent, or Firm*—Michael N. Meller; Eugene Lieberstein

[57] ABSTRACT

A miniaturized magnetic head which can reduce running torque of a disk driving motor while head-touch and penetration margin of the magnetic head remain effective. The magnetic head comprises a slider which slides on a flexible magnetic disk, a head core, integrally formed with the slider, to perform recording/reproducing of information on/from the flexible magnetic disk, and a groove, having a width of less than 0.4 mm, formed on a sliding surface of the slider, the groove extending in a tangential direction of the rotation of the flexible magnetic disk and reaching from one end of the slider to the other end of the slider.

2 Claims, 7 Drawing Sheets

MAGNETIC HEAD

This application is a continuation, of application Ser. No. 08/053,601, filed Apr. 27, 1993, now abandoned.

BACKGROUND OF THE INVENTION

The present invention generally relates to a magnetic head, and more particularly to a miniaturized magnetic head which maintains a good contact with a disk and has an effect of reducing power consumption for a disk driving motor.

In recent years, miniaturization in size and thickness of personal computers has advanced. These computers are called notebook type or book type computers, and further development for miniaturization has been progressed. These computers need to be provided with a memory apparatus which stores programs and data. Magnetic disk apparatuses are widely used in personal computers. In the notebook type or book type computers, for example, magnetic disk apparatuses are generally used as a memory apparatus. Since the space provided for the magnetic apparatus is limited in these types of computers, development of a further miniaturized magnetic disk apparatus is required.

As magnetic disk apparatuses have been miniaturized, the magnetic head used in the magnetic apparatuses are required to be further miniaturized. Additionally, in a portable computer, a rechargeable battery is used for power supply, and usable time is limited due to the limited capacity of the battery. Among parts that consume electric power, the disk driving motor is the major unit responsible for the consumption of electric power. Accordingly, if usage of the disk driving motor increases, the usable time of the computer is shortened.

A conventional magnetic head used for a magnetic disk apparatus, as shown in FIGS. 1A and 1B, comprises a slider 1 and a head core 2. The slider 1 and the head core 2 are integrally formed in one piece. A groove 3, which extends in the tangential direction of disk rotation, is provided on a sliding surface of the slider 1. The groove 3 is positioned in the center of the sliding surface of the magnetic head, and the width L of the groove is approximately 0.7 mm to 1.2 mm.

Generally, two magnetic heads are provided in a single magnetic disk apparatus so that recording of information and reproducing of information can be performed at either surface of a disk. FIG. 2 is a side view of this type of head structure in a state where the heads contact both sides of a disk. In the figure, each of two magnetic heads 5 is slidably contacting respectively either surface 4a or 4b of a magnetic disk 4. As the magnetic disk 4 rotates, an air flow is generated inside the groove 3 that results in generation of a negative pressure inside the groove 3. The negative pressure exerts an attracting force on the magnetic head toward the surface 4a or 4b of the magnetic disk 4. This attracting force enables stabilization of the head-touch (degree of head contact) of the magnetic head 5 with the surface 4a or 4b of the magnetic disk 4.

As the magnetic head 5 is miniaturized, the area of the sliding surface of the magnetic head, which surface contacts and slides on the surface 4a or 4b of the magnetic disk 4, becomes small. In a case where such a miniaturized magnetic head is provided with a head-loading force (a pressing force) equal to a conventional magnetic head, sliding resistance increases and thus the running torque of the disk driving motor is increased.

If the width of the groove 3 of the magnetic head 5 is relatively large as it is in the conventional magnetic head, head-touch of the magnetic head becomes stable, while the running torque (power consumption) is drastically increased. Particularly, in the case of the battery driven apparatus such as a portable personal computer, the energy consumption rate of the battery becomes fast, and thus there is a problem in that the usable time is shortened.

Additionally, if the width of the groove is large, the penetration margin tends to become small. Here, the penetration margin is the tolerance of the position of a magnetic head relative to a magnetic disk in a direction perpendicular to a surface of the magnetic disk required to perform effective recording or reproducing at a signal level higher than a predetermined level. When the penetration margin becomes small due to a movement of the magnetic disk in a direction perpendicular to a surface of the magnetic disk, there may be a problem in that the recording or reproducing level tends to easily decrease.

SUMMARY OF THE INVENTION

It is a general object of the present invention to provide an improved and useful magnetic head in which the above-mentioned problems are eliminated.

A more specific object of the present invention is to provide a miniaturized magnetic head which can reduce the running torque of a disk driving motor while head-touch and penetration margin of the magnetic head remain effective.

In order to achieve the above-mentioned objects, a magnetic head according to the present invention used for a miniaturized magnetic disk apparatus comprises:

a slider which slides on a flexible magnetic disk;

a head core, integrally formed with the slider, to perform recording/reproducing of information on the flexible magnetic disk; and a groove, having a width of less than 0.4 mm, formed on a sliding surface of the slider, the groove extending in the tangential direction of the rotation of the flexible magnetic disk and reaching from one end of the slider to the other end of the slider.

According to the present invention, by reducing the sliding resistance of the miniaturized magnetic head against the magnetic disk by narrowing the width of the groove on the sliding surface of the magnetic head to less than 0.4 mm, the running torque of a disk driving motor in the magnetic disk apparatus is reduced, while head-touch and penetration margin of the magnetic head are maintained in good conditions. Thus power consumption of the disk driving motor is reduced, resulting in realization of a miniaturized magnetic head suitable for a miniaturized magnetic disk apparatus.

Other objects, features and advantages of the present invention will become more apparent from the following detailed descriptions when read in conjunction with the accompanying drawings.

DETAILED DESCRIPTION OF THE PREFERRED EMBODIMENT

Figure 1A:
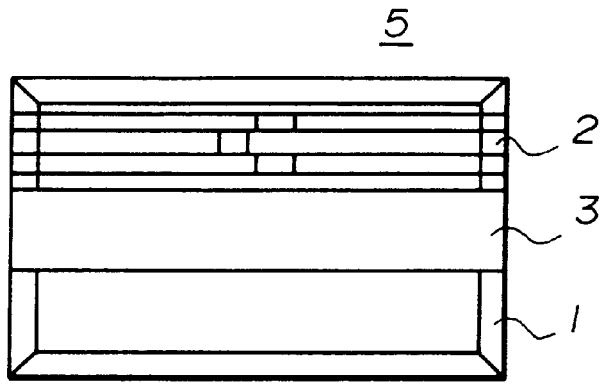
FIG. 1A is an enlarged plan view of a conventional magnetic head.
Figure 1B:
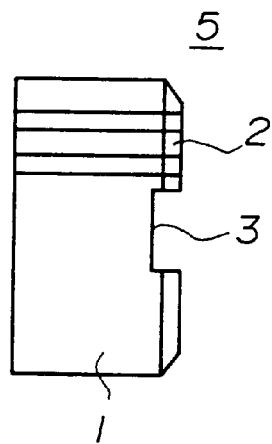
FIG. 1B is a side view of the magnetic head shown in FIG. 1A.
Figure 2:
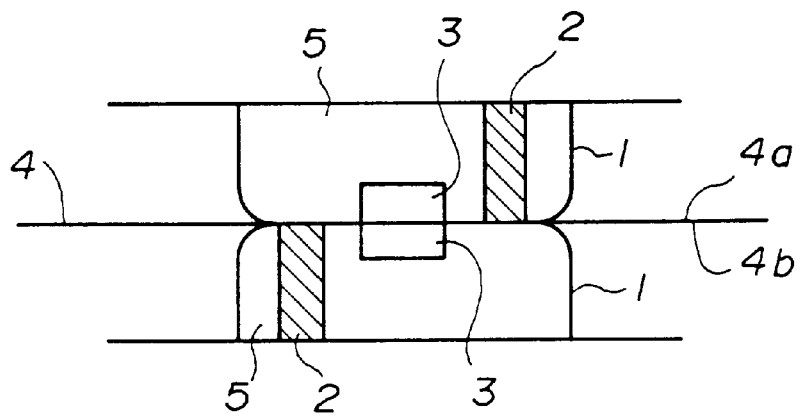
FIG. 2 is a side view showing an upper head and a lower head in contact with a magnetic disk.
Figure 3:
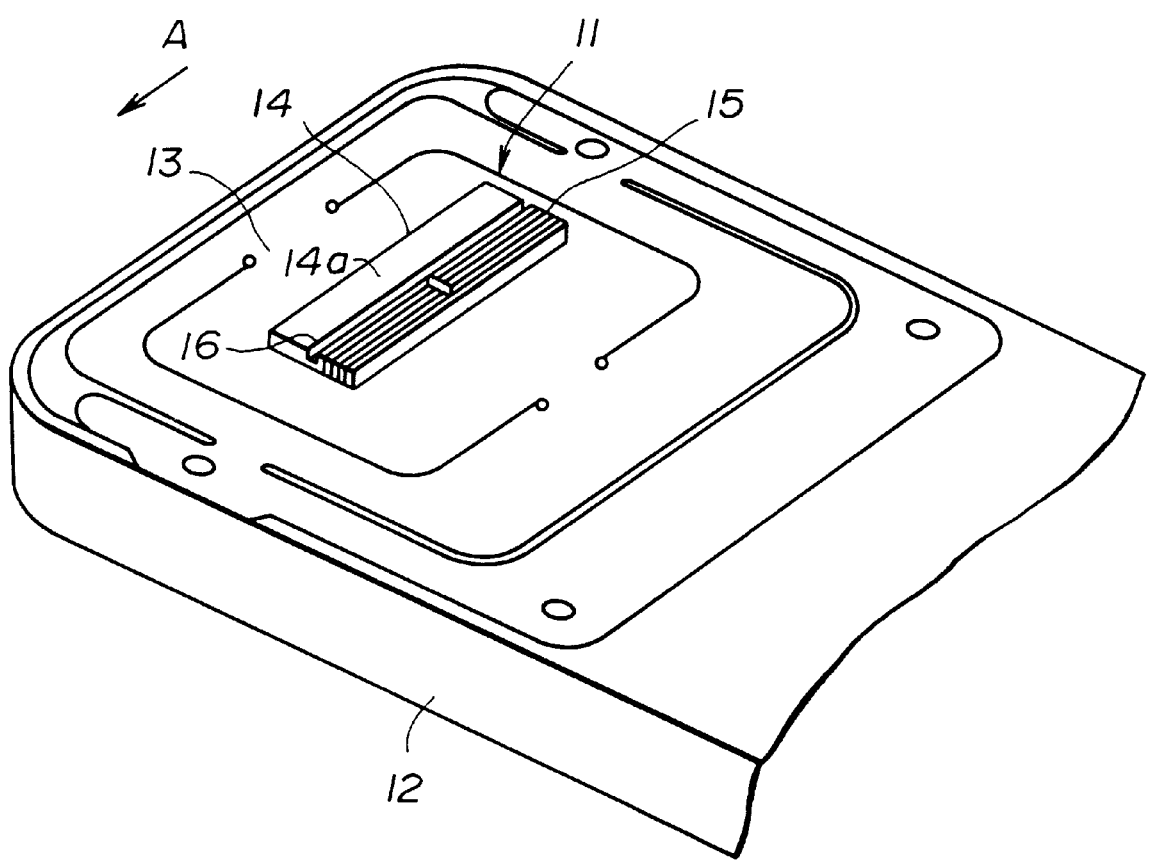
FIG. 3 is a perspective view of a magnetic head according to the present invention.

A description will be given of a magnetic head according to an embodiment of the present invention. FIG. 3 is a perspective view of the magnetic head according to an embodiment of the present invention.

In FIG. 3, a magnetic head 11 according to the present invention is fixed on a gimbal plate 13 provided on a head arm 12 of a 3.5-inch magnetic disk apparatus. The magnetic head 11 is miniaturized so as to be used in a magnetic disk apparatus which is miniaturized in size and thickness. The magnetic head 11 is constructed such that a ceramic slider 14 and a ferrite head core 15 are joined to form one piece.

Figure 4A:
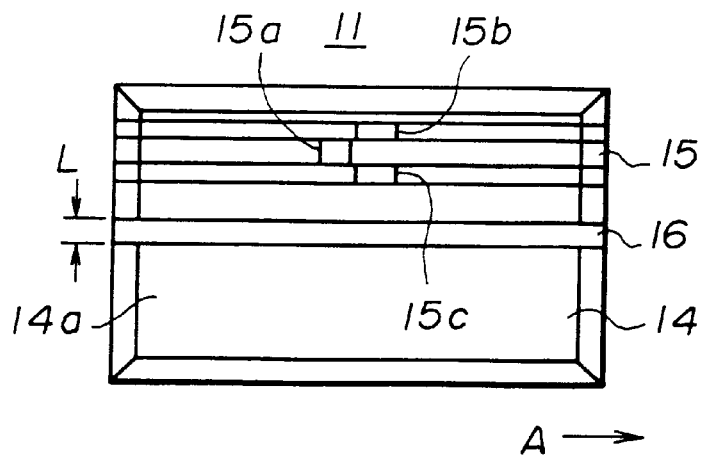
FIG. 4A is an enlarged plan view of the magnetic head shown in FIG. 3.
Figure 4B:
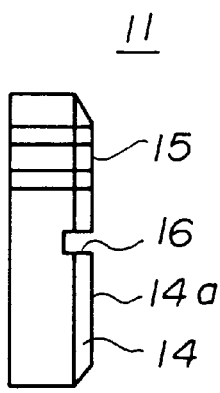
FIG. 4B is a side view of the magnetic head shown in FIG. 4A.

FIG. 4A is an enlarged plan view of the magnetic head 11 and FIG. 4B is a side view of the magnetic head 11.

A groove 16, extending in a tangential direction (indicated by an arrow A in the figure) of rotation of a magnetic disk to be loaded in the magnetic disk apparatus, is formed along the center of a sliding surface 14a of the slider 14. The width of the groove 16 is less than 0.4 mm, that is, smaller than the width of conventional magnetic head groove (L=0.7~1.2 mm).

The head core 15 has a read/write gap 15a for recording/reproducing information on/from a magnetic disc and erase gaps 15b and 15c respectively positioned either side of the read/write gap 15a.

Figure 5:
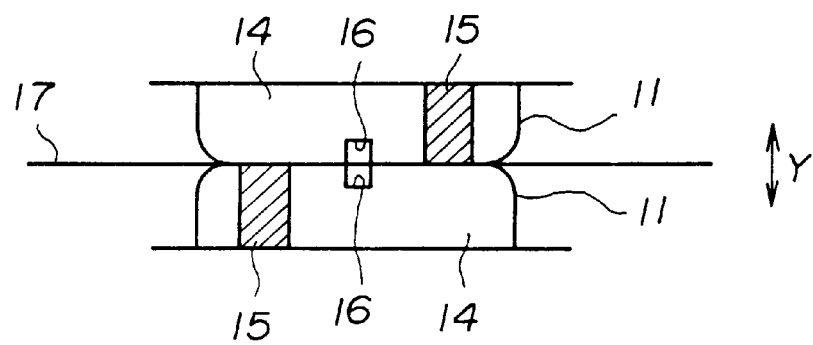
FIG. 5 is a side view showing magnetic heads shown in FIGS. 4A and 4B contacting either side of a magnetic disk.

FIG. 5 is a side view showing magnetic heads 11 contacting either side of a magnetic disk. In this construction, a flexible magnetic disk 17 is sandwiched between the two magnetic heads 11 on either side so that recording/reproducing of information is performed on/from either side of the flexible magnetic disk 17. As shown in FIG. 5, through passages are formed by groove 16 and a flexible magnetic disk 17 through which air flows upon rotation of the flexible magnetic disk 17. The air flow through inside the passage (groove 16) generates a negative pressure inside the groove 16 and that results in the magnetic head being attracted towards the flexible magnetic disk 17.

Although the area of the sliding surface of the magnetic head 11 is small compared to that of a conventional magnetic head, the sliding surface area remains greater than a predetermined area because the width L of the groove 16 is/less than 0.4 mm. Thus, if a head-loading force the same as that applied in conventional disk apparatus is applied to the magnetic head 11, the sliding resistance of the magnetic head 11 against the flexible magnetic disk 17 is reduced. As a results, the running torque (load) of the driving motor, not shown in the figures, is reduced and therefore power consumption of the driving motor is reduced.

Figure 6:
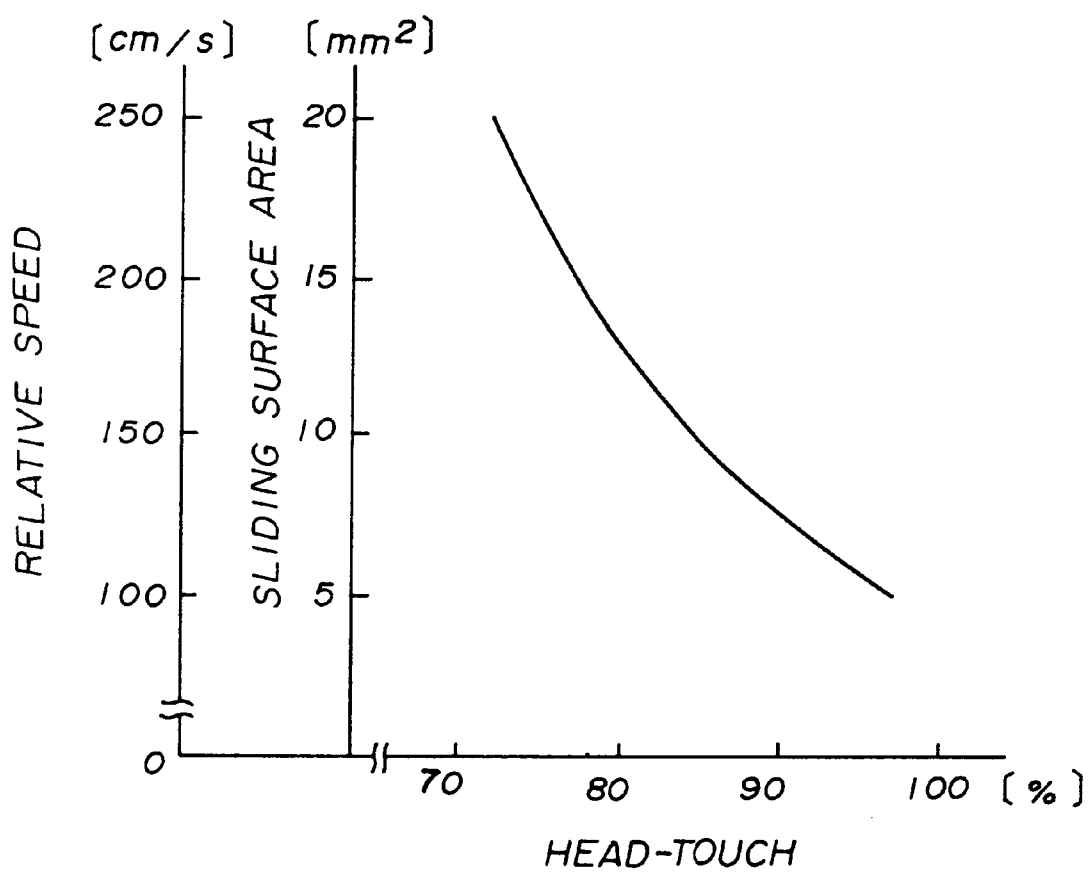
FIG. 6 is a graph showing head-touch for various relative disk speeds and for various area sizes of a sliding surface.

FIG. 6 is a graph showing the variation of head-touch of the magnetic head 11 against the magnetic disk for various relative disk speeds and for various surface area values of a sliding surface. Apparent from the graph, head-touch is improved as the speed of the magnetic head 11 relative to the flexible magnetic disk 17 becomes smaller. Additionally, it is found that head-touch is improved as the sliding area becomes smaller.

Accordingly, it is understood that head-touch may be remarkably improved if the magnetic head 11 is incorporated into a magnetic disk apparatus using a 3.5-inch or smaller magnetic disk. It should be noted that the speed of a magnetic head relative to a disk of a 3.5-inch disk apparatus is 72.8~148.9 cm/sec.

Figure 7:
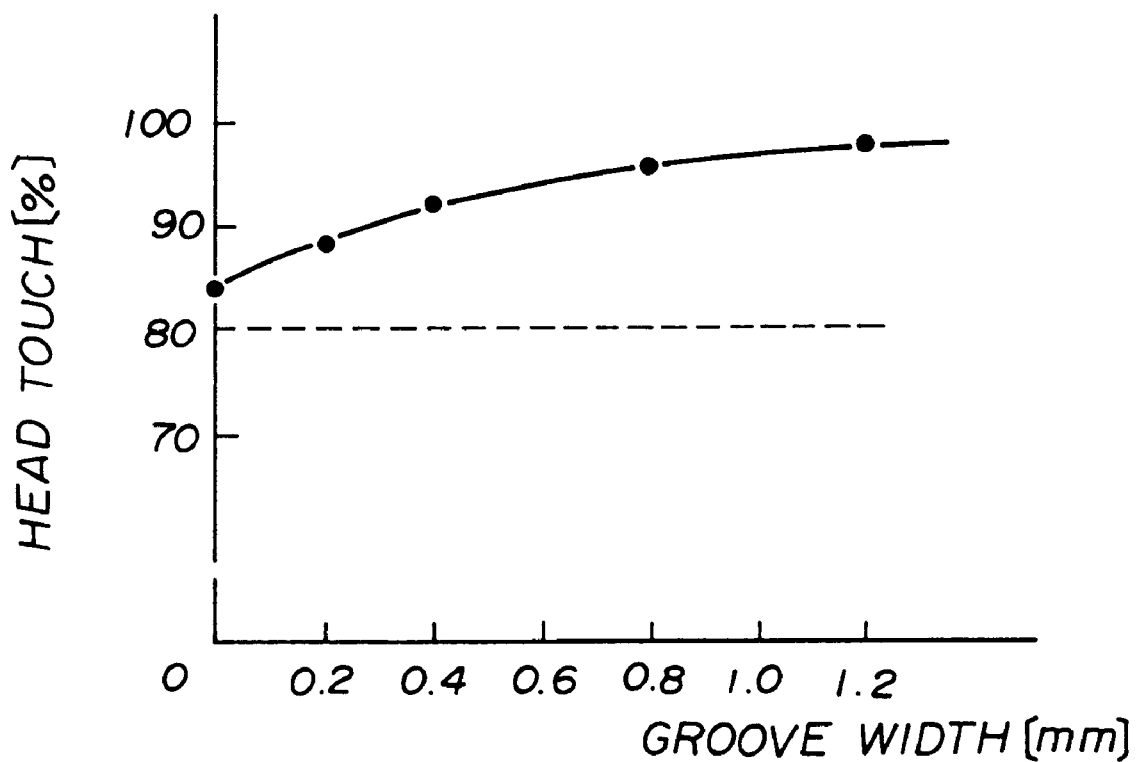
FIG. 7 is a graph showing head-touch for various groove widths.

FIG. 7 is a graph showing head-touch for various groove widths. The experiment was conducted by using the above-mentioned magnetic head 11 with a variety of groove widths and by setting the relative speed of the magnetic head to approximately 125 cm/sec. As apparent from the graph shown in FIG. 7, head-touch is improved as the groove width becomes greater. This results from the increase of a negative pressure generated inside the groove as the groove width becomes greater. However, if the groove width becomes greater, the sliding resistance of the magnetic head 11 is also increased and thus running torque of the driving motor is increased.

Here, 100% of head-touch means that the sliding surface of a magnetic head is in contact with the magnetic disk in an ideal condition. If head-touch is maintained above 80%, there is little influence on the recording/reproducing function performed by read/write gap 15a and erase gaps 15b and 15c. Therefore, it is found from the graph shown in FIG. 7 that even if the groove width is made small, or no groove is formed, head-touch sufficient to perform a normal recording/reproducing function can be obtained.

Figure 8:
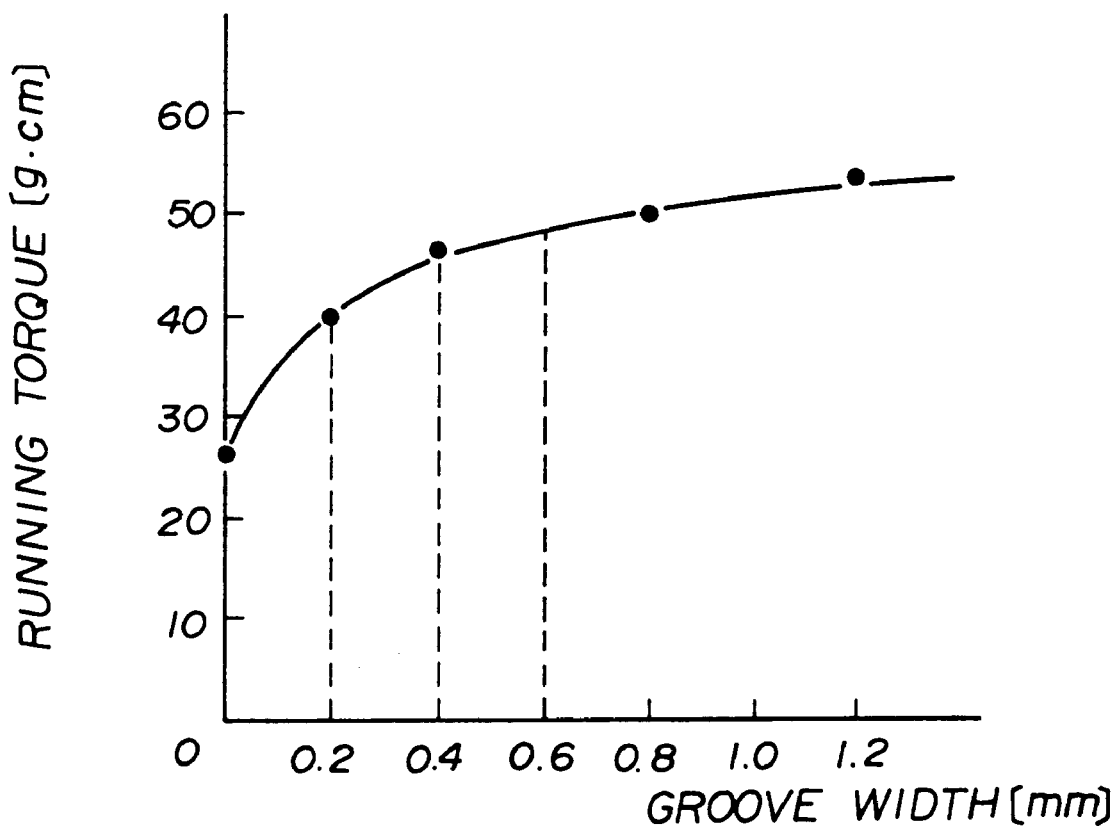
FIG. 8 is a graph showing running torque of a disk driving motor for various groove widths.

FIG. 8 is a graph showing running torque of a disk driving motor for various groove widths. The results shown in FIG. 8 were obtained by setting the head-loading force, which is the force with which a magnetic head presses against a magnetic disk, to approximately 20 g. It is found from the graph that running torque decreases, even in the condition where head-loading force is constant, as the groove width becomes smaller. This is because sliding resistance is reduced by decreasing the groove width which allows the sliding area to be maintained greater than a predetermined area although the overall size of the magnetic head 11 is reduced compared to conventional magnetic heads.

Now, refer to the running torque at the groove width of 0.4 mm. When the groove width is reduced from 0.6 mm to 0.4 mm, the running torque decreases by only 2 g·cm. Since the running torque at the groove width of 0.4 mm is 46 g·cm, this decrease is approximately 4% of the running torque at groove width of 0.4 mm. On the other hand, the decrease in the running torque when the groove width is reduced from 0.4 mm to 0.2 mm is 6 g·cm, which corresponds to a 13% decrease in running torque. Judging from the above, the reduction rate of running torque of the driving motor greatly changes around the groove width of 0.4 mm.

Figure 9:
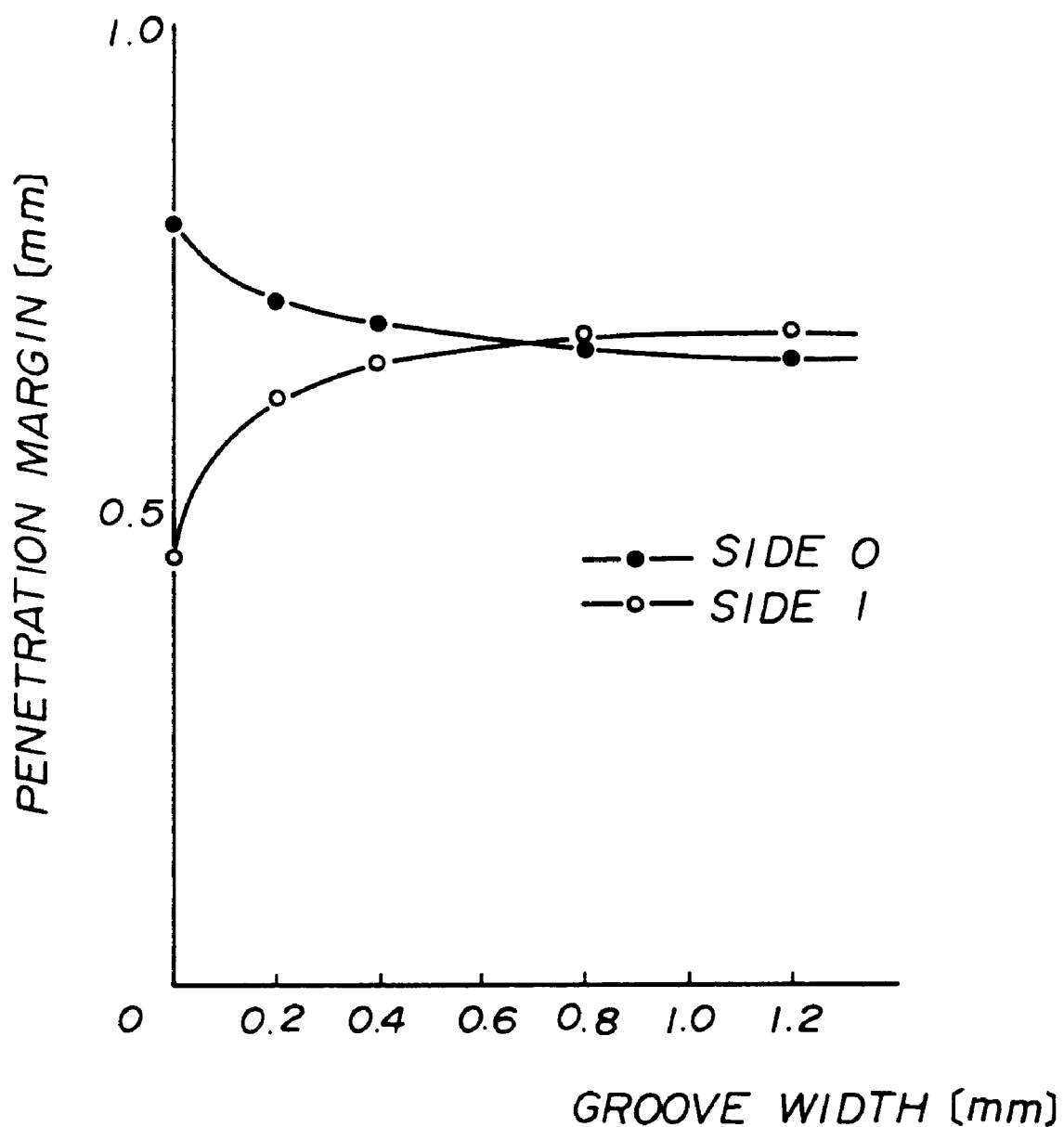
FIG. 9 is a graph showing penetration margin of an upper head and a lower head for various groove widths.

FIG. 9 is a graph showing variations of penetration margin of an upper head (SIDE1) and a lower head (SIDE0) for various groove widths.

It is found from the graph that the penetration margin of the lower head becomes greater as the groove width becomes smaller, and becomes smaller as the groove width becomes greater. The reason for this is that the lower head is fixed to a carriage, not shown in the figures, at a position slightly higher than the plane on which a magnetic disk lies when it is loaded. That is, when the magnetic disk is in the loaded position, the disk is pressed against the lower head by elastic force of the disk. By means of this pressing force of the magnetic disk, the lower head achieves a good head-touch.

Contrary to the upper head, the penetration margin of the lower head improves as the groove width becomes smaller. This is because the disk tends to move slightly up and down in a direction perpendicular to the surface of the disk and this movement of the disk may cause incomplete contact of the magnetic head against the magnetic disk. When the magnetic disk does not make complete contact with the sliding surface of the magnetic head, the effect of negative pressure inside the groove is no longer significant. This occurs intermittently during rotation of the disk and results in instability in the exertion force between the magnetic head and the magnetic disk.

On the other hand, the upper head is attached to the head arm 12 which is rotatable with respect to the carriage and thus the upper head can move with the movement of the magnetic disk. According to this effect, the instability of the force such as in the lower head does not occur in the upper head, resulting in that the penetration margin of the upper head improves as the groove width is increased. It is found from the graph shown in FIG. 9 that the rate of increase of penetration margin of the upper head is decreased at a groove width of approximately 0.4 mm.

In conclusion, in a construction having two magnetic heads contacting either side of a magnetic disk, despite the fact that the lower head is smaller than a conventional one, head-touch and penetration margin are improved and sliding resistance is reduced by decreasing the groove width to less than 0.4 mm. As a result, the load on a disk driving motor, which consumes a large amount of electric power, is reduced and power consumption of the motor is thus reduced. Therefore, in a battery driven magnetic disk apparatus, use of battery power is reduced which results in lengthening of the usable time of the magnetic disk apparatus.

Considering the above-mentioned results of the experiments represented by the graphs, reduction in running torque, sufficient head-touch and improvement of penetration margin can be simultaneously obtained by having the groove width of the lower head be 0.4 mm and that of the upper head be less than 0.4 mm (including a case where no groove is formed). Accordingly, if the magnetic disk 17 moves in the direction perpendicular to the surface of the magnetic disk 17 (indicated by an arrow Y of FIG. 5), the recording/reproducing can be maintained at an effective level. Additionally, although penetration margin tends to become small when head-loading force is reduced, it can be improved by reducing the groove width.

It should be noted that although in the above mentioned embodiment the magnetic head 11 is used for a 3.5-inch magnetic disk apparatus, the present invention can be applied to a magnetic head used for a 3-inch or 2-inch magnetic disk apparatus since the relative speed of these apparatus is slower than a 3.5-inch magnetic disk apparatus for which the above-mentioned effects can be expected to be more significant.

The present invention is not limited to the specifically disclosed embodiment, and variations and modifications may be made without departing from the scope of the present invention.

What is claimed is:

1. A magnetic head mechanism used for a miniaturized magnetic disk apparatus, a lower and an upper magnetic head being provided in said magnetic head mechanism, said upper magnetic head being provided on a head arm being rotatably supported with respect to a head carriage and making contact with the upper surface of a flexible magnetic disk, said lower magnetic head being provided on a head carriage and making contact with the lower surface of said flexible magnetic disk, said two magnetic heads opposing each other with said flexible magnetic disk therebetween, said magnetic head mechanism comprising:

said upper magnetic head being provided on said head arm rotatably supported with respect to said head carriage, having a first slider which slides on the upper surface of said flexible magnetic disk, and a first head core, integrally formed with said first slider, to perform recording/reproducing of information on/from said flexible magnetic disk, said first slider having a groove with a width from 0.2 mm to 0.4 mm, formed on a sliding surface of said first slider, said groove extending in a tangential direction of the rotation of said flexible magnetic disk and lying from one side face of said first slider to the other side face of said first slider; and said lower magnetic head being fixedly mounted on said head carriage, having a second slider, which slides on the lower surface of said flexible magnetic disk, having a planar sliding surface, without a groove being formed on the sliding surface of said second slider, said sliding surface of said lower magnetic head being positioned higher than said magnetic disk, and a second head core, integrally formed with said second slider, to perform recording/reproducing of information on/from said flexible magnetic disk.

2. The magnetic head as claimed in claim 1, wherein a speed of said upper and lower magnetic heads relative to said magnetic disk is less than 148.9 cm/sec.

* * * * *

UNITED STATES PATENT AND TRADEMARK OFFICE
CERTIFICATE OF CORRECTION

PATENT NO. : 6,097,576
DATED : August 1, 2000
INVENTOR(S) : Fukuchi et al.

It is certified that error appears in the above-identified patent and that said Letters Patent is hereby corrected as shown below:

<u>Title page,</u>
Item [75], Inventor, the correct residence of the last inventor, Yoshiaki SAKAI should read: -- Higashikurume --

Signed and Sealed this

Eleventh Day of December, 2001

*Attest:*

NICHOLAS P. GODICI
*Attesting Officer*     *Acting Director of the United States Patent and Trademark Office*